United States Patent [19]

Peterson et al.

[11] Patent Number: 4,492,949
[45] Date of Patent: Jan. 8, 1985

[54] TACTILE SENSORS FOR ROBOTIC GRIPPER AND THE LIKE

[75] Inventors: Robert R. Peterson, Hudson; Dale W. Schubert, Sudbury; Peter N. Cholakis, Hopkinton, all of Mass.

[73] Assignee: Barry Wright Corporation, Newton Lower Falls, Mass.

[21] Appl. No.: 476,685

[22] Filed: Mar. 18, 1983

[51] Int. Cl.³ .......................................... H01C 10/10
[52] U.S. Cl. ...................................... 338/114; 338/99
[58] Field of Search ................ 338/114, 99, 100, 101; 73/172, 432 R; 324/65 R

[56] References Cited

U.S. PATENT DOCUMENTS

| | | | |
|---|---|---|---|
| 3,509,296 | 4/1970 | Harshman et al. | 338/99 X |
| 3,836,900 | 9/1974 | Mansfield | 338/99 X |
| 4,014,217 | 3/1977 | Lagasse et al. | 338/114 X |
| 4,050,756 | 9/1977 | Moore | 338/114 X |
| 4,208,648 | 6/1980 | Naumann | 338/114 X |
| 4,328,441 | 5/1982 | Kroeger, Jr. et al. | 310/319 |

FOREIGN PATENT DOCUMENTS

| | | | |
|---|---|---|---|
| 2115555 | 9/1983 | United Kingdom | 338/114 |
| 2115556 | 9/1983 | United Kingdom | 338/114 |

Primary Examiner—Roy N. Envall, Jr.
Assistant Examiner—C. N. Sears
Attorney, Agent, or Firm—Milton E. Gilbert; Gary E. Ross; Nicholas A. Pandiscio

[57] ABSTRACT

A tactile sensor for sensing an object in contact therewith. In its preferred form, the sensor comprises a plurality of layers disposed in a sandwich arrangement. A top layer is comprised of a flexible, electrically-insulating material and a plurality of parallel flexible conductive rods. A bottom layer is comprised of an electrically-insulating material and a plurality of parallel conductive rods that extend at right angles to the conductive rods of the top layer, thus forming a sensory array comprising a plurality of superimposed intersection points arranged in a grid pattern. An intermediate layer is comprised of a resilient, electrically-insulating material in which is disposed a plurality of parallel conductive posts that extend perpendicular to the plane of the three layers. These posts are comprised of a resilient conducting material. Each conductive post is disposed at one of the sensor's aforementioned intersection points so as to electrically couple one of the conductive rods of the top layer to one of the conductive rods of the bottom layer. The conductive rods are formed with a selected cross-section, in order that changes in the amount of pressure exerted on the sensor will produce corresponding logarithmic exchanges in the contact surface area, and hence electrical contact resistance, established between the conductive rods and those conductive posts disposed beneath the points of pressure.

31 Claims, 8 Drawing Figures

TACTILE SENSORS FOR ROBOTIC GRIPPER AND THE LIKE

FIELD OF THE INVENTION

This invention relates to industrial robots in general, and more particularly to tactile sensors for use in such robots.

BACKGROUND OF THE INVENTION

Industrial robots are well known in the art. Such robots are intended to replace human workers in a variety of assembly tasks. It has been recognized that in order for such robots to effectively replace human workers in increasingly more delicate and detailed tasks, it will be necessary to provide sensory apparatus for the robots which is functionally equivalent to the various senses with which human workers are naturally endowed, e.g. sight, hearing, etc.

Of particular importance for delicate and detailed assembly tasks is the sense of touch. Touch can be important for close-up assembly work where vision may be obscured by arms or other objects, and touch can be important for providing the sensory feedback necessary for grasping delicate objects firmly without causing damage to them. Touch can also provide a useful means for discriminating between objects having different sizes, shapes or weights. Accordingly, various tactile sensors have been developed for use with industrial robots.

One such tactile sensor, developed by William D. Hillis and John Hollerback, is disclosed in the article, "How Smart Robots Are Becoming Smarter", by Paul Kunnucan, High Technology Magazine, Sept./Oct. issue, pp. 32,36, Technology Publishing Company. This tactile sensor comprises 256 pressure-sensitive electrical switches arranged in a 16×16 grid pattern. When an object is brought into contact with the sensor, appropriate switches are triggered so as to produce a pattern of electrical signals which correspond to the "feel" of the object contacting the sensor. Hillis and Hollerback constructed their tactile sensor by sandwiching a piece of ordinary pantyhose between a top layer comprised of a piece of non-conductive silicon rubber impregnated with conductive graphite along 16 parallel lines and a bottom layer comprised of a printed circuit board having 16 parallel conducting lines disposed therein. Hillis and Hollerback oriented their top and bottom layers relative to one another so that the 16 parallel conducting lines in the top layer were disposed at right angles to the 16 parallel conducting lines in the bottom layer, thereby forming a sensory array comprising 256 superimposed intersection points arranged in a 16×16 grid pattern. The conducting lines of the top layer are normally separated from the conducting lines of the bottom layer by the pantyhose. However, when an object comes into contact with the sensor and exerts a requisite minimum pressure on the sensor, the conducting lines make contact with one another through the meshes of the pantyhose at those intersection points disposed beneath the points of pressure, thereby allowing current to flow between the top and bottom layers at selected locations so as to produce a pattern of electrical signals which corresponds to the "feel" of the object contacting the sensor.

This same concept is believed disclosed in another publication, "Active Touch Sensing" by William Daniel Hillis, distributed by the MIT Artificial Intelligence Laboratory as A.I. Memo 629. In this second publication, Hillis also describes replacing the intermediate layer of pantyhose with an alternative separator layer comprised of non-conductive paint. This non-conductive paint is sprayed directly onto the bottom side of the top layer as a fine mist so that it adheres thereto as a collection of spaced, non-conductive dots. The conducting lines of the top layer are normally separated from the conducting lines of the bottom layer by the misted layer of non-conductive paint. When an object comes into contact with the sensor and exerts a requisite minimum pressure on the sensor, the conducting lines of the top layer make contact with the conducting lines of the bottom layer through the gaps existing between adjacent dots of non-conductive paint at those intersection points disposed beneath the points of pressure, thereby allowing current to flow between the top and bottom layers at selected locations so as to produce a pattern of electrical signals which corresponds to the "feel" of the object contacting the sensor.

U.S. Pat. No. 4,208,648 discloses another tactile sensor which comprises 256 pressure-sensitive electrical switches arranged in a 16×16 grid pattern, such that when an object is brought into contact with the sensor, appropriate switches are triggered so as to produce a pattern of electrical signals corresponding to the "feel" of the object contacting the sensor. The tactile sensor disclosed in U.S. Pat. No. 4,208,648 differs significantly from the aforementioned sensors in many of the particulars of its construction and operation. More particularly, the sensor disclosed in U.S. Pat. No. 4,208,648 comprises three distinct layers disposed in a sandwich arrangement. The top layer is comprised of a resilient, electrically-insulating material in which is disposed a first set of 16 parallel conducting lines. The bottom layer is comprised of a resilient, electrically-insulating material in which is disposed a second set of 16 parallel conducting lines. The bottom layer is disposed relative to the top layer so that the second set of conducting lines extend at right angles to the first set of conducting lines, thus forming a sensory array comprising 256 superimposed intersection points arranged in a 16×16 grid pattern. The intermediate layer is comprised of a synthetic resin material which is electrically conductive to some extent in its natural, unstressed state, and whose conductivity is increased by compression. When an object exerts a requisite minimum pressure on the sensor, the conductivity of the intermediate layer is altered at those locations disposed beneath the points of pressure. As a result, the current flowing between the first and second sets of conducting lines is also altered at the locations affected by pressure, and a pattern of electrical signals is produced which corresponds to the "feel" of the object contacting the sensor.

Unfortunately, the tactile sensors described above are believed to suffer from one or more of the following limitations: (1) poor reliability, (2) poor durability, (3) high cost of manufacture, (4) significant complexity of manufacture, (5) limited sensitivity, (6) complicating signal "cross-talk" (where the current signal travels through the intermediate layer at locations other than those disposed at the points of pressure) and (7) a pressure/current relationship of limited utility.

OBJECTS OF THE INVENTION

Accordingly, the principal object of the present invention is to provide an improved form of tactile sensor which overcomes or reduces the limitations set forth above.

SUMMARY OF THE INVENTION

These and other objects of the present invention are attained in a preferred embodiment by providing a tactile sensor which comprises three distinct layers disposed in a sandwich arrangement. The top layer is comprised of a flexible, electrically-insulating material and a plurality of parallel flexible conductive rods. The bottom layer is comprised of an electrically-insulating material and a plurality of parallel conductive rods that extend at right angles to the conductive rods of the top layer, thus forming a sensory array comprising a plurality of superimposed intersection points arranged in a grid pattern. The intermediate layer is comprised of a resilient, electrically-insulating material in which is disposed a plurality of parallel conductive posts that extend perpendicular to the planes of the three layers. These posts are comprised of a resilient conducting material. Each conductive post is disposed at one of the sensor's aforementioned intersection points so as to electrically couple one of the conductive rods of the top layer to one of the conductive rods of the bottom layer. The conductive rods are formed with a selected cross-section, in order that changes in the amount of pressure exerted on the sensor will produce corresponding changes in the contact surface area, and hence a change in the electrical contact resistance, between the conductive rods and those conductive posts disposed beneath the points of pressure. As a result of this construction, the sensor is capable of better providing a pattern of electrical signals which, through use of an appropriate computer and computer software, will provide a determination better approximating the "feel" of an object contacting the sensor.

BRIEF DESCRIPTION OF THE DRAWINGS

These and other objects and features of the present invention will be more clearly described or rendered obvious in the following detailed description of the preferred embodiment, which is to be considered together with the accompanying drawings wherein like numbers refer to like parts and further wherein.

DETAILED DESCRIPTION OF THE PREFERRED EMBODIMENT

Figure 1:
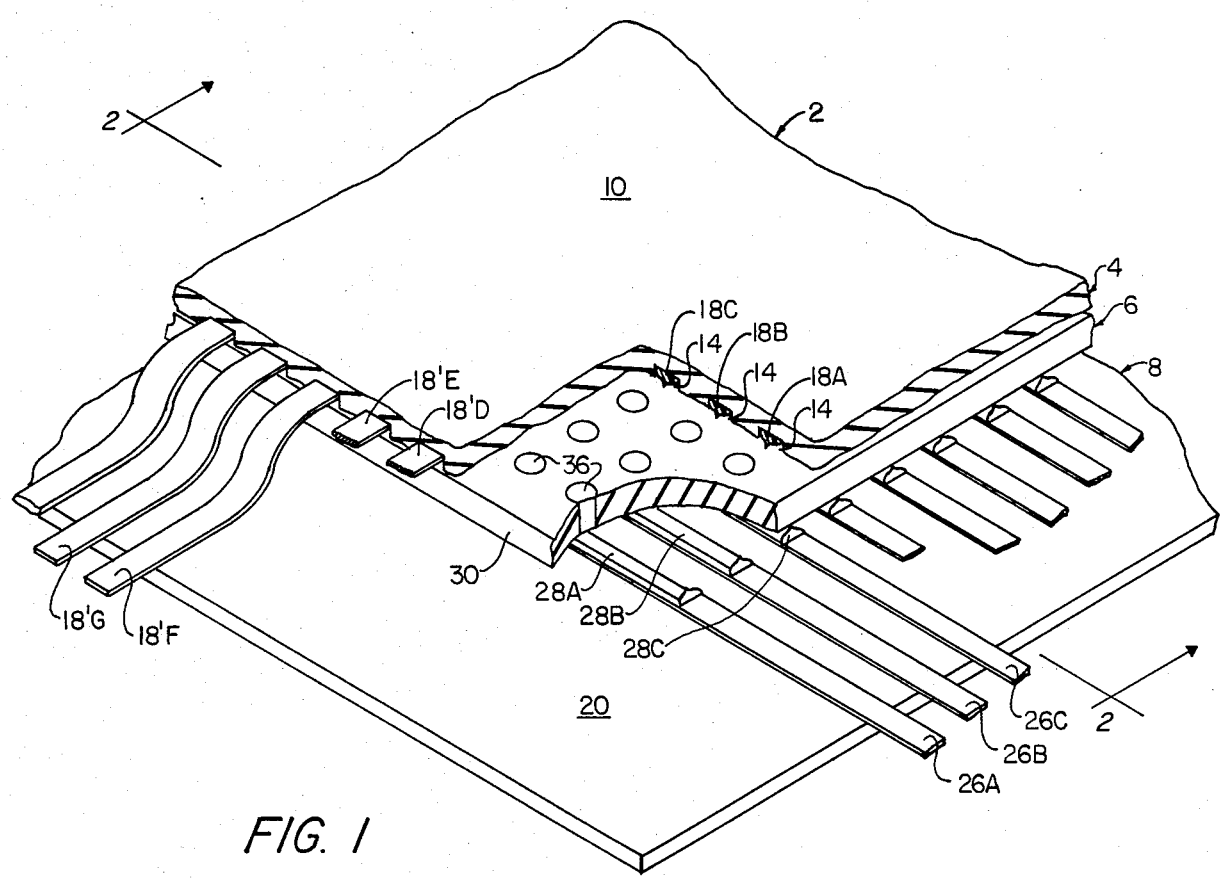
FIG. 1 is a fragmentary perspective view with portions broken away of the preferred embodiment of the present invention.
Figure 2:
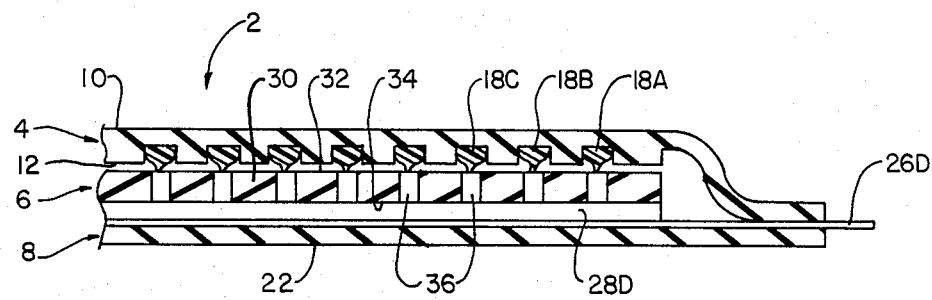
FIG. 2 is a sectional view taken along line 2—2 of FIG. 1.

Looking first to FIGS. 1 and 2, the tactile sensor 2 generally comprises three distinct layers disposed in a sandwich arrangement: a top layer 4, an intermediate layer 6, and a bottom layer 8.

Top layer 4 is comprised of a flexible, electrically-insulating material which is abrasion-resistant. Preferably top layer 4 is formed out of a polymeric material such as an elastomer, for example, a blend of polybutadiene and natural rubber, and has a hardness of between about 50 and 60 durometer on the Shore A-2 scale. Layer 4 has a planar top surface 10 and a planar bottom surface 12 provided with a plurality of parallel grooves 14. In the preferred embodiment there are 16 grooves 14.

Each of the grooves 14 has a conductive rod 18A, 18B, 18C, etc., secured therein by an adhesive or equivalent means. Rods 18A, 18B, 18C, etc., are formed out of a flexible conductive material. Preferably rods 18A, 18B, 18C, etc. are made of a polymeric elastomer, e.g., chloroprene, which is doped with a suitable conducting material, e.g., carbon black. Rods 18A, 18B, 18C, etc. are formed so that they have a hardness of between about 70 and 80 durometer on the Shore A-2 scale.

Figure 3:
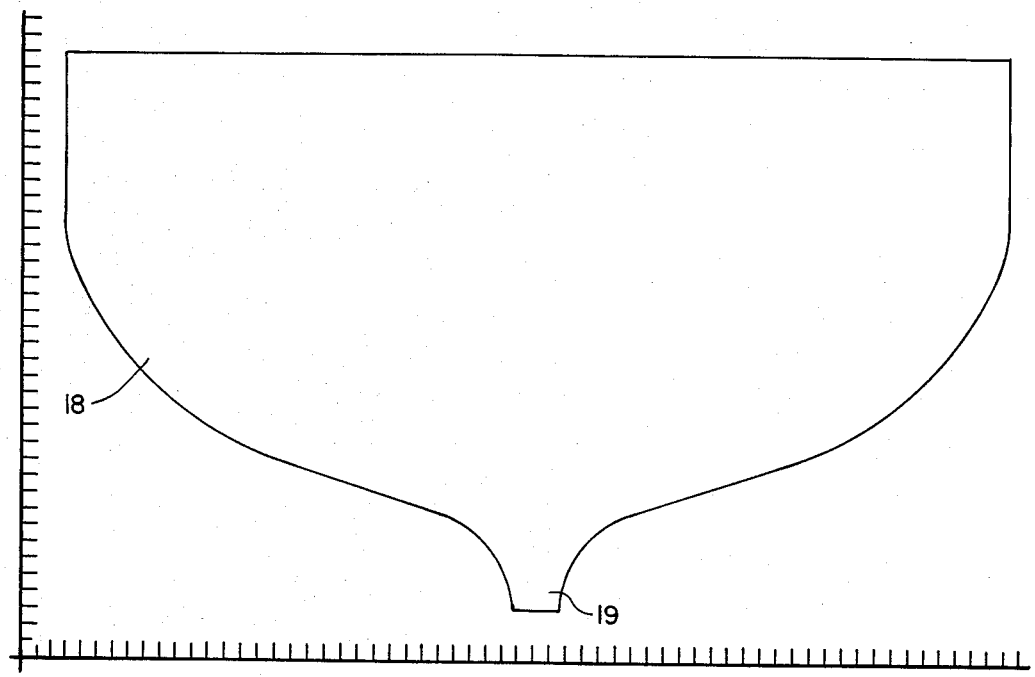
FIG. 3 is a scaled illustration of the cross-sectional shape of the conductive rods used in the preferred embodiment shown in FIGS. 1 and 2.

Conductive rods 18A, 18B, 18C, etc., are shaped so that at their intermediate portions (i.e. those portions of the rods which extend adjacent intermediate layer 6) each has a cross-sectional profile generally similar to the cross-sectional profile of a "hull" of a ship. The cross-sectional profile of the intermediate portions of rods 18A, 18B, 18C, etc., is shown in greater detail in FIG. 3. As seen in FIG. 3, the intermediate portions of the conductive rods are formed with a double curvature of a selected functional character and have a projecting nose portion 19. Grooves 14 and conductive rods 18A, 18B, 18C, etc., are sized relative to one another so that the projecting nose portions 19 of conductive rods 18A, 18B, 18C, etc., extend below the bottom surface 12 of top layer 4 (see FIG. 2). As will hereinafter be discussed in greater detail, conductive rods 18A, 18B, 18C, etc. are shaped at their end portions (i.e. those portions of the rods which project out beyond the region of intermediate layer 6, so that each has a substantially rectangular cross-section, as indicated in FIG. 1 at 18'D, 18'E, 18'F, etc.

Bottom layer 8 is comprised of a rigid, electrically-insulating material such as a non-conducting polymer or the sort of material typically used to fabricate circuit board substrates, e.g., resin-impregnated fiberglass sheets. Layer 8 has a planar top surface 20 and a planar bottom surface 22, and is provided with a plurality of flat conductive copper buses 26A, 26B, 26C, etc. In the preferred embodiment there are 16 buses 26A, 26B, 26C, etc. Buses 26A, 26B, 26C, etc., are preferably fixed in place on the top surface 20 of bottom layer 8 by bonding or other equivalent means. Buses 26A, 26B, 26C, etc., are sized relative to bottom layer 8 so that an end portion of each bus extends out beyond the end of bottom layer 8, as shown in FIGS. 1 and 2.

Bottom layer 8 also has a plurality of conductive rods 28A, 28B, 28C, etc., disposed thereon. Conductive rods 28A, 28B, 28C, etc., are preferably identical to conductive rods 18A, 18B, 18C, etc. described above, except that they lack any flat projecting end portions corresponding to the projecting end portions 18'D, 18'E, 18'F, etc. noted above. In the preferred embodiment there are 16 rods 28A, 28B, 28C, etc. Rods 28A, 28B, 28C, etc., are preferably fixed in place as shown in FIGS. 1 and 2 by an adhesive or other equivalent means so that rods 28A, 28B, 28C, etc., make good conductive contact with buses 26A, 26B, 26C, etc.

Bottom layer 8 is disposed relative to top layer 4 so that conductive rods 28A, 28B, 28C, etc., extend at right angles to conductive rods 18A, 18B, 18C, etc., thereby forming a sensory array comprising 256 superimposed intersection points arranged in a 16×16 grid pattern. Preferably conductive rods 18A, 18B, 18C, etc.

are uniformly spaced from one another, and the same is true for conductive rods 28A, 28B, 28C, etc.

Intermediate layer 6 is comprised of a pad 30 formed out of a non-conducting elastomeric material such as polyurethane and has a hardness of between about 40 and 60 durometer on the Shore A-2 scale. Pad 30 has planar top and bottom surfaces 32 and 34. Intermediate layer 6 also comprises a plurality of transversely-extending conductive posts 36. Posts 36 extend perpendicular to the major plane of pad 30 and run between and intersect the pad's top and bottom surfaces 32 and 34. Conductive posts 36 are formed from an elastomeric material which is electrically-conductive. Posts 36 are preferably formed out of a material of selected conductivity, e.g., a polymer such as chloroprene compounded with carbon black so as to be conductive, and have a hardness of between about 50 and 60 durometer on the Shore A-2 scale. As seen in FIGS. 1 and 2, one conductive post 36 is disposed at each of the sensor's aforementioned intersection points so as to electrically couple one of the conductive rods 18A, 18B, 18C, etc., of top layer 4 to one of the conductive rods 28A, 28B, 28C, etc., of bottom layer 8.

As seen in FIG. 2, when no force is applied to the top surface 10 of the sensor, only the projecting nose portions of conductive rods 18A, 18B, 18C, etc., contact the conductive posts 36, and only the projecting nose portions of conductive rods 28A, 28B, 28C, etc., contact the conductive posts 36. However, when an object comes into contact with the top surface 10 of the sensor and exerts a certain requisite minimum pressure on the sensor, layers 4, 6 and 8 are forced together so that conductive rods 18A, 18B, 18C, etc., and conductive rods 28A, 28B, 28C, etc., approach one another at the points of pressure. As the conductive rods 18A, 18B, 18C, etc., and the conductive rods 28A, 28B, 28C, etc., are forced together at the points of pressure, the conductive rods tend to press into the softer intermediate layer 6 so as to increase their effective surface area contact with those conductive posts 36 disposed about the points of pressure. As a result, the electrical contact resistance established between the conductive rods and those conductive posts disposed beneath the points of pressure tends to decrease correspondingly, whereby for a given vltage applied between rods 18A, 18B, 18C, etc. and rods 28A, 28B, 28C, etc. the current flow will increase in inverse relation to the changes in contact resistance.

On account of the foregoing construction, it will be seen that a pressure-sensitive switch is formed at each of the sensor's intersection points. When coupled to an appropriate electric circuit, these switches are together capable of producing a pattern of electrical signals corresponding to the "feel" of an object contacting the sensor.

It will be appreciated that the conductive rods 18A, 18B, 18C, etc. must be sufficiently flexible along their length so that the localized application of pressure at an intersection point will not register significantly at adjacent intersection points. At the same time, however, the conductive rods 18A, 18B, 18C, etc. must have a sufficient hardness vis-a-vis the components in intermediate layer 6 so that it is the layer 6., and not the conductive rods, which deforms under the application of pressure. The cross-sectional geometry chosen for conductive rods 18A, 18B, 18C, etc., and conductive rods 28A, 28B, 28C, etc. (shown in detail in FIG. 3), is such that the pressure/current relationship of sensor 2 tends to have a non-linear response of substantially logarithmic form which enables it to accurately reflect minute variances of pressure under very light loads as well as great variances of pressure under very heavy loads. It is to be noted that the cross-sectional shape of rods 18A, 18B, 18C, etc. and rods 28A, 28B, 28C, etc. are similar to the cross-sectional profile of the hole of a ship having symmetrical double curvatures which work with the nose portions 19 to give the desired effect. It will also be appreciated that the precise pressure/current relationship of the sensor 2 will depend also on a number of other factors such as layer thicknesses, layer compositions, and also the relative hardnesses of conductive rods 18A, 18B, 18C, etc., and 28A, 28B, 28C, etc., and conductive posts 36. By selectively adjusting the aforementioned factors, it is possible to build a tactile sensor having the desired sensitivity.

In order to render the tactile sensor 2 substantially impervious to the effects of certain inhospitable climates, e.g., water or oil, it is preferred that the edges of top layer 4 and bottom layer 8 extend out beyond the edges of intermediate layer 6, so that the two may be brought together and joined to form a sealed environment. More particularly, it is preferred that top layer 4 be folded down and bonded to bottom layer 8 in the manner shown in FIG. 2. At the same time, in order to allow the sensor to be coupled into an appropriate electric circuit, the projecting end portions 18′A, 18′B, 18′C, etc. of conductive rods 18A, 18B, 18C, are turned down as shown in FIG. 1 so that they run along the top surface 20 of bottom layer 8 towards the perimeter of the sensor, and these projecting end portions (formed with a substantially rectangular cross-section, as noted above) and buses 26A, 26B, 26C, etc. extend out beyond the sealed side edges of the sensor, ready to be coupled to an appropriate electric circuit.

Figure 4:
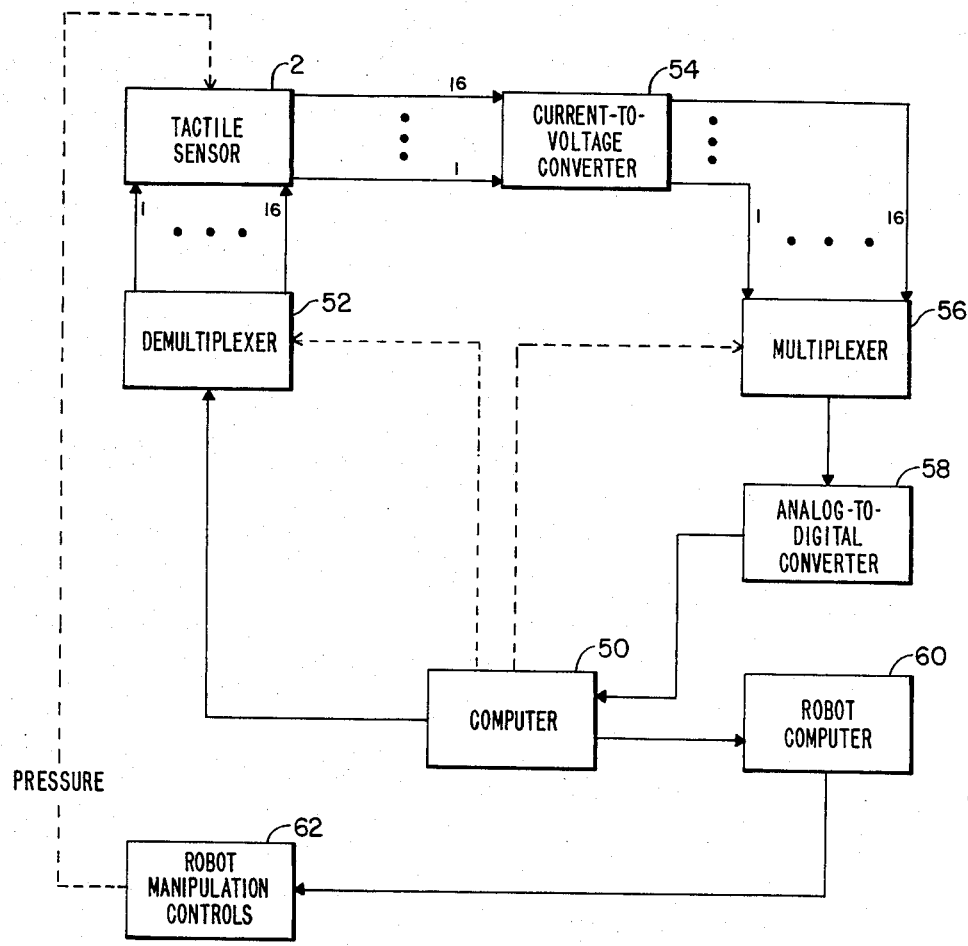
FIG. 4 is a block diagram of an electronic control circuit integrating the present invention.

FIG. 4 shows how the preferred form of tactile sensor 2 may be coupled into an electric circuit for use with an industrial robot. This circuit generally comprises a computer 50 which is coupled to the input line of a 16-line demultiplexer 52. Computer 50 is also coupled to demultiplexer 52 by a control line (shown in phantom). The 16 output lines of demultiplexer 52 are respectively attached to the 16 projecting end portions of conductive rods 18A, 18B, 18C, etc. of sensor 2. The 16 projecting end portions of buses 26A, 26B, 26C, etc., of sensor 2 are respectively attached to the 16 input lines of a current-to-voltage converter 54. The 16 output lines of the converter 54 are respectively attached to the 16 input lines of a multiplexer 56. The output line of multiplexer 56 is coupled to an analog-to-digital converter 58 and the control line of multiplexer 56 (shown in phantom) is coupled to the computer 50. The output from converter 58 is fed to computer 50. The output of computer 50 is coupled to a robot computer 60, which is itself attached to robot manipulation controls 62. Robot manipulation controls 62 control an arm or other robot appendage working in cooperation with tactile sensor 2. It is to be appreciated that computer 50, demultiplexer 52, current-to-voltage converter 54, multiplexer 56, analog-to-digital converter 58, robot computer 60, and robot manipulation controls 62 are all of the sort well known in the art.

In a typical case, the sensor 2 is mounted to a robot appendage so that the rigid bottom layer 8 faces and is fixed to the appendage and the flexible top layer 4 faces outwardly in position to engage an object to be handled.

During operation of the robot, the presence of an object on sensor 2 is determined by the control circuit in the following manner. The computer 50 sends a signal to demultiplexer 52 to energize conductive rod 18A. Since conductive rod 18A is coupled to each of the conductive rods 28A, 28B, 28C, etc., by conductive posts 36 at the sensor's superimposed intersection points, energizing conductive rod 18A produces a current in each of the conductive rods 28A, 28B, 28C, etc. However, as previously described, the current flowing in each of the lines 28A, 28B, 28C, etc. will vary from one another in accordance with the amount of pressure being applied to the sensor at the intersections of conductive rod 18A with conductive rods 28A, 28B, 28C, etc. Converter 54 receives the current present in each of the conductive rods 28A, 28B, 28C, etc. by virtue of its connections to buses 26A, 26B, 26C, etc., and converts the current flowing in each of the conductive rods 28A, 28B, 28C, etc., to a corresponding voltage. The output from converter 54 is then passed along to multiplexer 56. Computer 50 uses multiplexer 56 as a gating mechanism so as to allow it to sequentially sample the output from each of the conductive rods 28A, 28B, 28C, etc., and to feed the outputs to converter 58. The latter converts these analog voltage outputs to digital signals which are automatically fed to computer 50. Then the computer orders demultiplexer 52 to deenergize conductive rod 18A and energize conductive rod 18B. Since conductive rod 18B is coupled to each of the conductive rods 28A, 28B, 28C, etc., by conductive rods 36 at the sensor's superimposed intersection points, energizing conductive rod 18B raises a current in each of the conductive rods 28A, 28B, 28C, etc. However, as previously described, the current flowing in each of the lines 28A, 28B, 28C, etc., will vary from one another in accordance with the amount of pressure being applied to the sensor at the intersections of conductive rod 18B with conductive rods 28A, 28B, 28C, etc. The computer then uses the circuitry as outlined above to sequentially sample the output derived from conductive rods 28A, 28B, 28C, etc., and to apply the outputs to converter 58. This process is repeated over and over, until the computer 50 has sampled the electrical signals from all 256 intersection points on the sensor and has coordinated the digital data so as to form a conclusion regarding the presence of any object on the tactile sensor. The computer 50 then relays this digital information to the robot computer 60 which automatically adjusts the robot manipulation controls 62 as needed.

ADVANTAGES OF THE PRESENT INVENTION

The preferred embodiment of the present invention described and illustrated herein is believed to have numerous advantages over the prior art.

First, the tactile sensor disclosed herein has a wide range of sensitivity. The unique geometry of conductive rods 18A, 18B, 18C, etc., and 28A, 28B, 28C, etc., ensures that the sensor's signal output will vary logarithmically with contact pressures, in order that the sensor will be capable of determining minute variances in pressure under very light loads as well as great variances of pressure under very heavy loads.

Second, the tactile sensor disclosed herein is relatively reliable, durable, inexpensive to make, and simple to produce.

Third, the tactile sensor disclosed herein has an intermediate layer which is conductive only at the sensor's superimposed intersection points, so that signals can pass between the conductive rods of the top and bottom layers only at the intersection points.

Fourth, the tactile sensor is completely sealed from its environment so as to render it operational under a variety of threatening conditions.

MODIFICATIONS OF THE PREFERRED EMBODIMENT

It is, of course, possible to modify the preferred embodiment of the present invention without departing from the scope of the invention.

Thus, for example, the tactile sensor 2 may be formed with more or less than 16 conductive rods 18A, 18B, 18C, etc., and more or less than 16 conductive rods 28A, 28B, 28C, etc. Or the conductive rods 18A, 18B, 18C, etc., and conductive rods 28A, 28B, 28C, etc., may extend at some angle other than a right angle to each other.

Optionally, conductive posts 36 may be formed with a cross-sectional shape different than the circular one shown on FIGS. 1 and 2, e.g., square or other arbitrary shape; similarly, conductive rods 18A, 18B, 18C, etc., and 28A, 28B, 28C, etc., may be formed with a cross-sectional shape different than the one shown in FIGS. 1-3, e.g., triangular.

Furthermore, the sensor's bottom layer 8 need not be stiff or rigid but may be formed of a flexible material, such as that commonly used to form flexible circuit boards, or a material the same or similar to the material of which top layer 4 is made.

Obviously, the way in which the tactile sensor 2 is coupled into the electric circuit shown in FIG. 4 may also be varied. Thus, for example, the output lines from demultiplexer 52 may be coupled to buses 26A, 26B, 26C, etc., and the input lines to converter 54 may be coupled to conductive rods 18A, 18B, 18C, etc. Also, computer 50 may be programmed to sample the current flowing through the sensor's intersection points in a sequence other than that disclosed. Alternatively, sensor 2 may be used with a circuit entirely different from that shown in FIG. 4.

Figure 5:
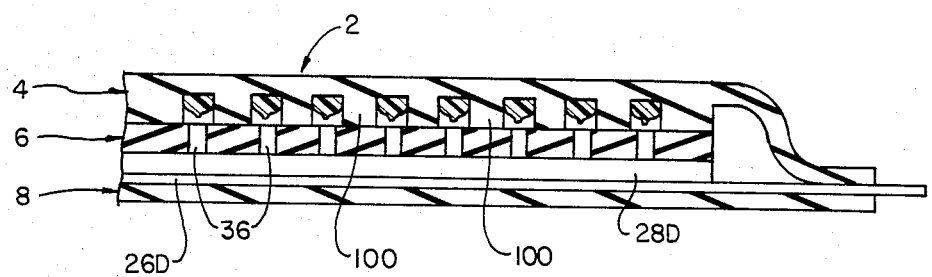

Referring to FIG. 5, the intergroove material in top layer 4 may be extended in length as shown at 100 so that the conductive rods 18A, 18B, 18C, etc. do not normally contact the posts 36 disposed in intermediate member 6. This construction results in the sensor requiring some non-zero pressure threshold before an electrical signal can pass between the conductive rods 18A, 18B, 18C, etc. of the top layer 4 and the conductive rods 28A, 28B, 28C, etc. of the bottom layer 8.

Figure 6:
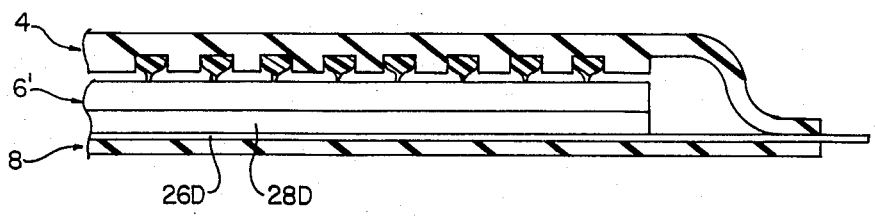
FIGS. 5-8 are alternative embodiments of the present invention.

Alternatively, as shown in FIG. 6, the intermediate layer 6 shown in FIGS. 1 and 2 may be replaced with a new intermediate layer 6' comprising a uniform sheet of an elastomeric material which is conductive, e.g., a silicone rubber layer impregnated with conductive particles such as particles of carbon, silver, copper and the like (see U.S. Pat. No. 4,208,648).

Figure 7:
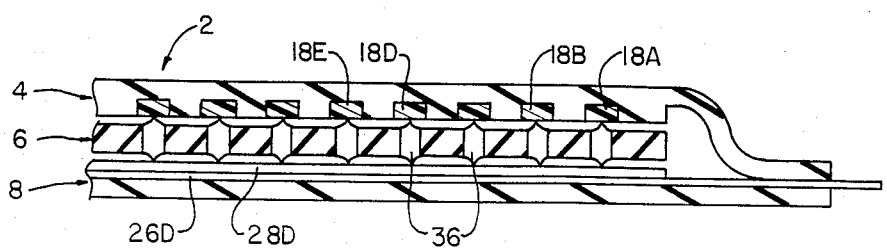

Also, as shown in FIG. 7, the conductive rods 18A, 18B, 18C, etc. and conductive rods 28A, 28B, 28C, etc. may be formed so that they have substantially rectangular or square cross-sections throughout their length, and the conductive posts 36 may be formed so that their projecting ends have cross-sectional profiles similar to the hull of a ship as previously described in connection with rods 18A, 18B, 18C, etc. and rods 28A, 28B, 28C, etc. Of course, in this arrangement the rods 18A, 18B, 18C, etc. and 28A, 28B, 28C, etc. will have a hardness less than the hardness of conductive posts 36, in order that rods 18A, 18B, 18C, etc. and 28A, 28B, 28C, etc. will deform under the application of pressure to the face of sensor 2 while posts 36 will remain substantially undeformed.

Figure 8:
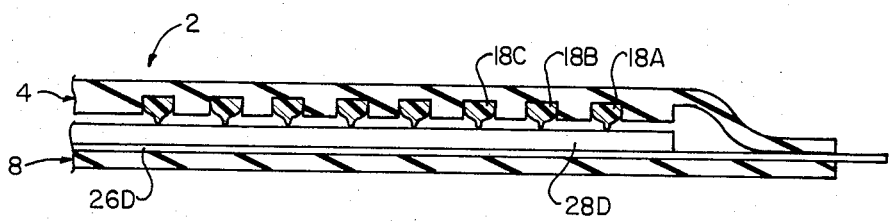

It is also envisioned, as shown in FIG. 8, that the intermediate layer 6 could be omitted entirely. In this case the conductive rods 18A, 18B, 18C, etc. would contact conductive rods 28A, 28B, 28C, etc. directly, and by forming one or both sets of rods from relatively soft compositions, the requisite pressure variations of surface area contact (and hence electrical contact resistance) could be achieved at the affected intersection points.

Furthermore, the sensor may be formed so that only the conductive rods of the top layer have a hardness greater than the intermediate layer, or so that only the conductive rods of the bottom layer have a hardness greater than the intermediate layer.

It is also envisioned that the top surface 10 of top layer 4 can be textured or have a tread-like contour so as to improve traction. Furthermore, the sensor need not be planar along its surfaces but rather each of the surfaces and their associated structure can be segments of a sphere or cylinder.

These and other similar modifications are believed obvious to one skilled in the art, and are within the scope of the present invention.

What we claim is:

1. A tactile sensor for sensing the pressure impressed by an object in contact therewith, said sensor comprising a sandwich having:
    (a) a top layer comprised of a first flexible, electrically-insultating material and a plurality of first flexible, electrically-conductive rods disposed in parallel grooves in said first electrically-insulating material;
    (b) a bottom layer secured to said top layer, said bottom layer being comprised of a second electrically-insulating material and a plurality of second electrically-conductive rods extending parallel to one another, said bottom layer being disposed relative to said top layer so that said first rods extend across and substantially parallel to said second rods; and
    (c) an intermediate layer engaged by said top and bottom layers, said intermediate layer being comprised of a selected material that is both resilient and electrically-insulating and a plurality of mutually-spaced electrically-conductive posts disposed in and extending transversely through said selected material so that the opposite ends of said posts confront said top and bottom layers, said electrically-conductive posts being made of a resilient material and being disposed so that the axis of each post intersects one each of said first and second rods, whereby a matrix of electrically conducting paths is provided by said first and second rods and said posts.

2. A tactile sensor according to claim 1 wherein said first and second conductive rods have a cross-sectional profile conforming substantially to the cross-sectional profile shown in FIG. 3.

3. A tactile sensor according to claim 2 wherein said second conductive rods are formed of a flexible material.

4. A tactile sensor according to claim 1 wherein the said conductive rods of at least one of said top and bottom layers are made of a resilient material and have a hardness greater than the hardness of said intermediate layer.

5. A tactile sensor according to claim 4 wherein said first and second electrically-insulating materials and said selected electrically-insulating material all comprise a polymer, and said conductive posts are comprised of a polymer compounded with a conducting material.

6. A tactile sensor according to claim 3 wherein said conductive rods comprise an elastomer.

7. A tactile sensor according to claim 6 having 16 conductive rods in said top layer and 16 conductive rods in said bottom layer.

8. A tactile sensor for sensing an object in contact therewith, said sensor comprising:
    (a) a top layer made of a first flexible, electrically-insulating material and including a plurality of first conductive rods extending parallel to one another in a first plane, said first conductive rods being flexible along their length and having a cross-sectional profile conforming substantially to the profile illustrated in FIG. 3;
    (b) a bottom layer made of a second electrically-insulating material and including a plurality of second conductive rods extending parallel to one another in a second plane extending substantially parallel to said first plane, said second conductive rods having a cross-sectional profile conforming substantially to the profile shown in FIG. 3, said bottom layer also being disposed relative to said top layer so that said second conductive rods extend at an angle to said first conductive rods, thus forming a sensory array comprising a plurality of superimposed intersection points arranged in a grid pattern; and
    (c) an intermediate layer extending in a third parallel plane and disposed between and engaged by said first and second layers, said intermediate layer being made of a resilient material which is electrically-conductive.

9. A tactile sensor according to claim 8 wherein said first and second conductive rods are formed of the same material.

10. A tactile sensor according to claim 9 wherein said first conductive rods and said second conductive rods have a hardness greater than the hardness of said intermediate layer.

11. A tactile sensor according to claim 10 wherein each of said first and second layers of electrically insulating material comprise a polymer, and said intermediate layer comprises a polymer compounded with a conducting material.

12. A tactile sensor according to claim 11 having 16 conductive rods in said top layer and 16 conductive rods in said bottom layer.

13. A tactile sensor according to claim 1 wherein said first electrically-insulating material has an outer edge which is sealed to said second electrically-insulating material so as to form a sealed environment for said intermediate layer.

14. A tactle sensor according to claim 1 whrein said first and second rods, said first electrically-insulating material, said selected material and said posts are all made of a resilient material, and further wherein said first and second rods have a compression stiffness greater than that of said selected material and said posts.

15. A tactile asensor according to claim 14 wherein said second electrically-insulating material is substantially rigid.

16. A tactile sensor according to claim 14 wherein said second electrically-insulating material is resilient.

17. A tactile sensor according to claim 13 wherein at least one of said top and bottom layers is arranged so that at least said first rods or said second rods are disengaged from said posts when said tactile sensor is not subjected to compression by the pressure of an object in contact therwith, whereby no electrical signal can pass from said first rods to said second rods via said posts until a predetermined non-zero pressure is applied to said sensor by an object in contact therewith.

18. A tactile sensor according to claim 17 wherein at least said first rods each have a cross-sectional shape that varies with increasing distance from said posts so that the contact areas between said first rods and said posts will increase as said first rods and said posts are pressed together.

19. A tactile sensor according to claim 1 wherein said first and second electrically-conductive rods are always engaged with said intermediate layer.

20. A tactile sensor according to claim 1 wherein said first and second conductive rods each have a cross-sectional configuration that conforms substantially to the cross-sectional configuration illustrated in FIG. 3.

21. A tactile sensor according to claim 1 wherein said bottom layer comprises a plurality of electrically-conductive busses, and each of said second rods is engaged with one of said busses.

22. A tactile sensor according to claim 21 wherein said busses extend parallel to and are aligned with said second rods.

23. A tactile sensor according to claim 22 wherein said second electrically-insulating material is rigid.

24. A tactile sensor according to claim 23 wherein said busses are bonded to said second electrically-insulating material.

25. A tactile sensor to claim 8 wherein said first and second rods engage opposite sides of said intermediate layer and said first and second layers are bonded to one another.

26. A tactile sensor according to claim 1 wherein the opposite ends of each of said posts engage selected ones of said first and second rods, and further wherein said opposite ends of said posts have cross-sectional shapes that vary so that the contact areas between the opposite ends of said posts and said first and second rods will increase as said first and second layers are pressed against said intermediate layer.

27. A tactile sensor according to claim 26 wherein the opposite ends of said posts have a cross-sectional configuration conforming substantially to the cross-sectional configuration illustrated in FIG. 3 of the attached drawings.

28. A tactile sensor according to claim 1 wherein said first rods extend beyond the outer edge of said intermediate layer and are bent so as to lie against said bottom layer.

29. A tactile sensor for sensing the pressure impressed by an object in contact therewith, said sensor comprising:
(a) a top layer comprised of a first flexible, electrically-insulating material and a first plurality of flexible electrically-conductive rods extending parallel to one another in grooves in said first electrically-insulating material; and
(b) a bottom layer comprised of a second electrically-insulating material and a second plurality of electrically-conducting rods extending parallel to one another;
said bottom layer being disposed relative to said top layer so that the rods of said first plurality of rods extend across and directly engage the rods of said second plurality of rods, whereby a plurality of electrically-conducting paths is provided by said first and second pluralities of rods;
the said rods of at least one of said top and bottom layers (a) each being elastomeric and (b) each having a cross-sectional shape that varies with increasing distance from the other of said top and bottom layers so that the contact areas between the rods of said first and second pluralities of rods will increase non-linearly as portions of said layers are deformed as a consequence of being pressed against one another.

30. A tactile sensor according to claim 29 wherein all of said rods and at least one of said first and second electrically-insulating materials is elastomeric.

31. A tactile sensor according to claim 30 wherein said second electrically-insulating material is rigid.

* * * * *